Dec. 15, 1925.
J. T. LELAND
DENTIFRICE
Original Filed Aug. 17, 1922
1,566,218
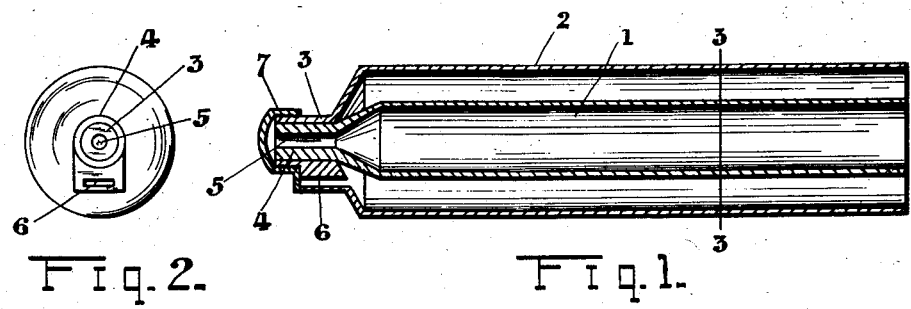
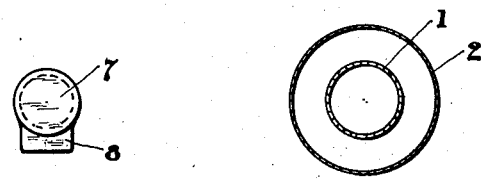
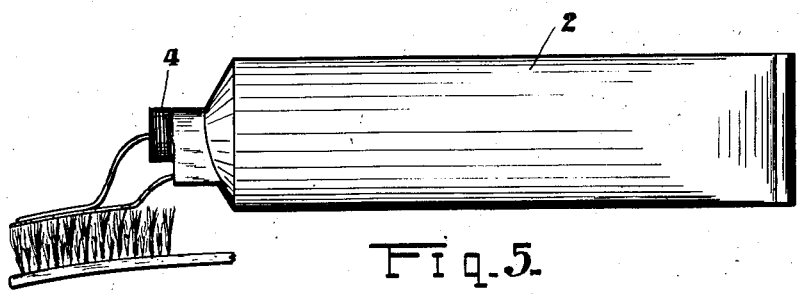
Inventor
J. T. Leland.

Patented Dec. 15, 1925.

1,566,218

UNITED STATES PATENT OFFICE.

JOHN T. LELAND, OF HERMAN, MINNESOTA.

DENTIFRICE.

Application filed August 17, 1922, Serial No. 582,492. Renewed October 21, 1925.

*To all whom it may concern:*

Be it known that I, JOHN T. LELAND, residing at Herman, county of Grant, and State of Minnesota, a citizen of the United States, have invented certain new and useful Improvements in Dentifrices, of which the following is a specification, reference being had to the accompanying drawings, forming a part thereof.

My invention relates to a dentifrice and method of forming the same and has for its object to produce a dentifrice which will be particularly effective not only to cleanse and whiten the teeth but also to destroy bacteria and also to serve as a prophylactic against development of goitre. A further object of the invention is to produce a two part dentifrice adapted when the two parts are mixed, to produce by chemical reaction, at the instant of use, a compound containing an antiseptic particularly adapted for use on the teeth and gums. A further object of the invention is to produce a method of forming a dentifrice containing an antiseptic at the instant of use.

With the objects above indicated and other objects hereinafter described in view my invention consists in the dentifrice and method of forming the same hereinafter described and claimed:

Referring to the drawings:

Figure 1 is a side view of a double collapsible tube adapted for use in carrying out the method of my invention.

Figure 2 is an end view of the same.

Figure 3 is a cross sectional view on line 3—3 of Figure 1.

Figure 4 is an end view of the cap.

Figure 5 is a view of the double tube in use.

My dentifrice consists of the product formed by combining two separate fluid compounds preferably at the moment of use. The first of these fluid compounds, which is used in relatively small quantity, consists of prepared chalk (creta preparata) six parts; iodine crystals, three one-hundredths of one part and sufficient quantity of glycerine to make a soft paste fluid enough to be readily squeezed from a collapsible tube. The second fluid compound consists of sodium chloride, one part; starch, eight parts; menthol crystals, three one-hundredths of one part and a sufficient quantity of liquid soap to form a soft paste fluid enough to be readily squeezed from a collapsible tube.

The two compounds are put together as they are applied to the tooth brush and their mixture is completed in applying the brush to the teeth. The iodine of the first compound, which is dissolved in the glycerine, upon contact of this compound with the second compound, reacts with the sodium chloride to form sodium iodide, setting free the chlorine, and also reacts with the starch to give the blue color characteristic of iodide of starch.

The mixture as applied to the teeth thus consists of sodium iodide, iodide of starch, menthol and free chlorine, all in small percentages, with a considerable proportion of prepared chalk, carried by glycerine and liquid soap.

The most important ingredient is the sodium iodide both because of its germicidal action on the teeth and gums and because of its recognized physiological action on the thyroid gland as prophylaxis against goitre.

The iodide of starch tends, as does bluing in washing clothes, by its blue color, to whiten the enamel of the teeth and while the effect of the reaction of the iodine with the starch is principally ocular, it presents a mixture upon which the ptyalin of the saliva must act impregnated with iodine. Whatever free chlorine is set free by the reaction of the iodine with the sodium chloride is formed as the reaction takes place and is immediately available as a germicide.

For convenience in use the two compounds are preferably put up in collapsible tubes as shown in the drawing, the first compound being placed in the smaller tube 1 and the second compound being placed in the larger tube 2. The nozzle 3 of tube 1 extends through the nozzle 4 of tube 2 and has relatively small central discharge opening 5 while the nozzle 4 of the larger tube has a relatively large discharge opening 6 on one side of its centre. A cap 7 fits on the nozzle 4 and has an arm 8 adapted to close the discharge opening 6.

The tube 1 being within the tube 2 pressure applied to the exterior of tube 2 to compress it, compresses the tube 1 also and causes both compounds to be forced out simultaneously. The tooth brush, previously moistened, being held beneath the nozzle the two compounds drop together onto the brush and as they come in contact the reaction above described begins and is completed as the brush is applied to the teeth effecting complete mixture of the compounds. The blue color shows at once on the first contact of the two compounds, the brown color of the first compound changing to blue and changing the white color of the second compound to blue.

It will, of course, be understood that the mixing of the two compounds to produce the reaction described may be effected by means other than the two collapsible tubes and the construction of these tubes forms no part of the invention of this application but forms the subject matter of a separate application filed by me on Aug. 18, 1922, Serial No. 582,777.

Instead of sodium chloride other sodium compounds such as sodium carbonate may be used.

Having thus described my invention what I claim is:—

1. A dentifrice consisting of two separate compounds one containing iodine and the other containing a sodium compound, adapted to react on contact, to produce sodium iodide.

2. A dentifrice consisting of two separate compounds one containing iodine and the other containing sodium chloride, adapted to react on contact, to produce sodium iodide.

3. A dentifrice consisting of two separate compounds one containing iodine and the other containing a sodium compound and starch, adapted to react on contact to produce sodium iodide and iodide of starch.

4. A dentifrice consisting of two separate compounds one containing iodine and prepared chalk, the other containing a sodium salt and soap, adapted to react on contact to produce a compound containing sodium iodide.

5. A dentifrice consisting of two separate compounds one containing iodine and prepared chalk, the other containing a sodium salt, starch and soap, adapted on contact to produce a compound containing sodium iodide and iodide of starch.

6. The method of forming a compound containing sodium iodide which consists in forming two separate pasty compounds one containing iodine in solution and the other containing a sodium salt in solution maintaining the compounds separate until wanted for use and then forcing the two compounds in relatively small streams into contact to thereby, by reaction of the iodine of one compound with the sodium salt of the other compound, form sodium iodide.

7. The method of forming a compound containing sodium iodide and iodide of starch which consists in forming two separate pasty compounds one containing iodine in solution and the other containing a sodium salt in solution and starch, maintaining the two compounds separate until wanted for use and then forcing the two compounds in relatively small streams into contact to thereby, by reaction of the iodine of one compound with the sodium salt and starch of the other compound, to form sodium iodide and iodide of starch.

In testimony whereof I hereunto affix my signature.

JOHN T. LELAND.